(12) United States Patent
Izawa et al.

(10) Patent No.: US 6,819,081 B2
(45) Date of Patent: Nov. 16, 2004

(54) POWER SOURCE APPARATUS

(75) Inventors: Ryosaku Izawa, Kasai (JP); Kiyoshi Kunimoto, Himeji (JP)

(73) Assignee: Sanyo Electric Co., Ltd., Osaka (JP)

( * ) Notice: Subject to any disclaimer, the term of this patent is extended or adjusted under 35 U.S.C. 154(b) by 151 days.

(21) Appl. No.: 10/353,020

(22) Filed: Jan. 29, 2003

(65) Prior Publication Data

US 2003/0141842 A1 Jul. 31, 2003

(51) Int. Cl.[7] .................................................. H02J 7/00
(52) U.S. Cl. ........................ 320/107; 320/109; 429/99
(58) Field of Search ............................. 320/107, 109, 320/112, 116, 117, 110; 439/627; 429/52, 99, 100, 159, 160

(56) References Cited

U.S. PATENT DOCUMENTS

| | | | |
|---|---|---|---|
| 4,322,597 A | * 3/1982 | Hooke | .................. 219/91.1 |
| 6,152,776 A | 11/2000 | Ikeda et al. | .................. 439/627 |
| 6,287,150 B1 | 9/2001 | Oda et al. | .................... 439/627 |
| 6,340,877 B1 | * 1/2002 | Mita et al. | .................. 320/112 |
| 6,465,123 B1 | * 10/2002 | Baumann et al. | ............. 429/99 |
| 6,541,154 B2 | * 4/2003 | Oogami et al. | ............. 429/159 |

FOREIGN PATENT DOCUMENTS

| | | |
|---|---|---|
| EP | 0 892 450 | 1/1999 |
| EP | 1 030 389 | 8/2000 |

* cited by examiner

*Primary Examiner*—Lawrence Luk
(74) *Attorney, Agent, or Firm*—Wenderoth, Lind & Ponack, L.L.P.

(57) ABSTRACT

A power source apparatus has a plurality of the battery modules housed in a case. The battery modules include a plurality of batteries joined in a straight line fashion. These battery modules are connected via bus-bars. Metal plate output terminals are attached to both ends of a battery module in a manner that is perpendicular to, and projecting from the battery end-planes. The case of the power source apparatus houses the battery modules with adjacent battery module output terminals connected via bus-bars.

20 Claims, 10 Drawing Sheets

FIG. 17 ed-plates 74 are provided at side regions of the case 70. the end-plates
POWER SOURCE APPARATUS This application is based on Application No. 24806 filed in Japan on Jan. 31, 2002, the content of which is incorporated hereinto by reference.

BACKGROUND OF THE INVENTION

The present invention concerns a power source apparatus which is primarily installed in an electric powered automobile such as a hybrid car.

Figure 1:
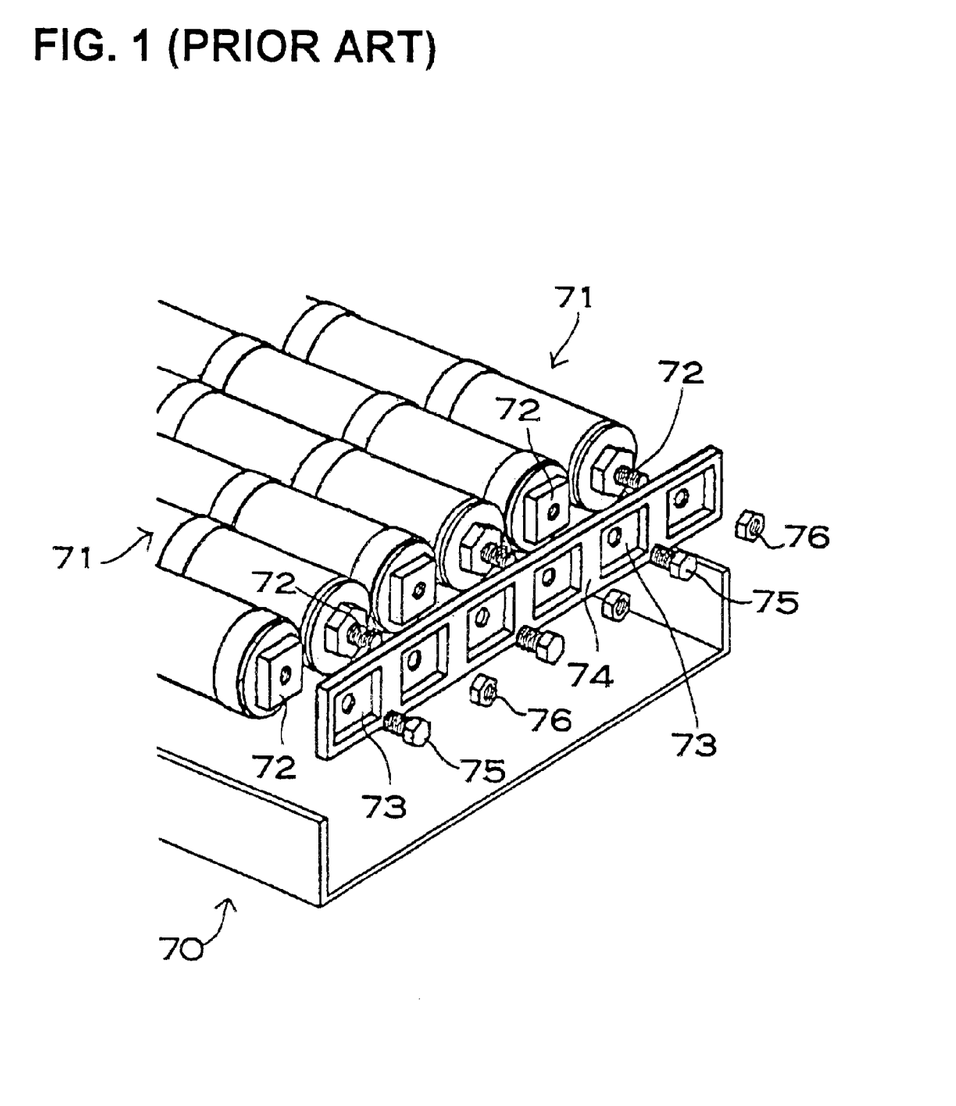
FIG. 1 is an exploded perspective view of a prior art power source apparatus.

A power source apparatus, housing battery modules held in a case, is used for applications requiring large output such as electric motor powered automobiles. Battery modules are made up of rechargeable batteries connected in a straight line. As shown in FIG. 1, this type of power source apparatus contains battery modules 71 housed in a case 70. Battery modules 71 housed in the case 70 have output terminals 72 made up of bolts and nuts fixed at both ends. Output terminals 72 of the battery modules 71 are connected in series at bus-bars 73. End-plates 74 containing the bus-bars 73 are provided at side regions of the case 70. the end-plates 74 are formed of molded plastic with bus-bars inserted in the end-plates during molding for insulation. In this configuration of the power source apparatus, output terminals 72 of the battery modules 71 are connected to the bus-bars 73 by fastening battery module bolts 75 and nuts 76 to the end-plate 74 bus-bars 73.

In a power source apparatus with the configuration shown in FIG. 1, it is difficult to absorb length differences and attach battery modules to the case when the battery modules have different lengths. In particular, when battery modules disposed adjacent to each other have different lengths and are connected to a bus-bar, this configuration has the drawback that excessive tensile force is exerted on the shorter battery module and excessive compressive force is exerted on the longer battery module. Since battery modules have a plurality of rechargeable batteries connected in a straight line, there will be overall length variation when there is inaccuracy in rechargeable battery length. For example, if inaccuracy in the length of a nickel hydrogen battery used in a hybrid car is ±0.3 mm, a battery module made up of six of these rechargeable batteries connected in a straight line will have a maximum length error of ±1.8 mm. in this case, approximately 3 mm of length difference can develop between longest and shortest battery modules. Consequently, when battery modules of different lengths are disposed in adjacent, parallel positions and tightly connected with a bus-bar, considerable stress is exerted on long and short battery modules.

A configuration, which connects bus-bars to an end-plate while allowing some play, can absorb battery module length dimension error. However, this configuration has the drawback that the structure is complex and manufacturing cost is high. Further, if adjacent battery modules have different lengths, bus-bars cannot be connected without some force even when they are connected to end-plates with this configuration. This is because one bus-bar connected to battery modules with different lengths will have an inclined orientation connected to the output terminals.

As shown in FIG. 1, it is necessary to attach battery modules, made up of circular cylindrical batteries connected in a straight line fashion, to the case 70 in a manner that avoids battery module rotation. Output terminals 72 fixed to both ends of battery modules 71 in FIG. 1 have square and hexlgonical shapes to prevent battery module 71 rotation. Battery module 71 rotation is prevented by inserting these polygonal shaped output terminals 72 in the end-plates 74. Therefore, this power source apparatus has the drawback that a configuration which prevents battery module rotation is required, and end-plate and output terminal structure becomes complex.

Further, the power source apparatus shown in FIG. 1 has the drawback that the case itself has a complex structure. This is because of the requirement for end-plates formed by mold-insertion of the bus-bars. Since bus-bars cannot, be completely buried in the end-plates leaving bus-bar surfaces exposed, these regions must be further insulated by covering them with insulating plates. Further, since nuts and bolts are fixed to battery modules, the structure to attach output terminals to battery modules becomes complex. This is because nuts and bolts cannot be directly weld-attached to an end-plane of a battery in a battery module. It is necessary to first attach nuts and bolts to a metal plate by a method such as welding, then weld-attach the metal plate to a battery end-plane. This has the drawback that the structure is complex and assembly is time consuming.

Finally, a power source apparatus with the structure shown in FIG. 1 has the drawback that replacement of a specific battery module, when that battery module has failed, is extremely difficult. This is because it is necessary to remove the end-plates 74 to replace a battery module. To remove an end-plate 74, it is necessary to remove all nuts 76 and bolts 75 connected to battery modules 71. Since several tens of battery modules are housed in a case, it is extremely troublesome to remove all nuts and bolts and remove the end-plates.

The present invention was developed to correct these drawbacks. It is thus a primary object of the present invention to provide a power source apparatus with a simple structure allowing battery modules of different lengths to be joined without applying excessive force, allowing battery modules to be mounted in a case in a manner preventing their rotation without providing a special structure to prevent rotation, and also allowing extremely efficient and simple assembly and battery module replacement with a simple case structure.

SUMMARY OF THE INVENTION

The power source apparatus of the present invention has a plurality of battery modules housed in a case, and these battery modules are connected by bus-bars. Battery modules are made up of a plurality of batteries connected in a straight line fashion. Battery modules have metal plate output terminals attached at both ends to battery end-planes in a manner projecting outward from the end-planes. The power source apparatus has a case which houses battery modules with adjacent battery module output terminals connected via metal plate bus-bars.

The power source apparatus described above has the characteristic that battery modules of different lengths can be connected in a simple configuration without applying excessive force. This is because battery modules have metal plate output terminals attached at both ends perpendicular to, and projecting from battery end-planes, adjacent battery module output terminals are joined by metal plate bus-bars, and the assembly is housed in a case. In a power source apparatus of this configuration, output terminals attached to both ends of the battery modules face perpendicular to the axis of the battery module, not in the direction of the axis. For this reason even when battery modules of different lengths are disposed in a case in a parallel fashion and tightly connected via bus-bars, application of excessive force between battery modules can be reliably prevented while length differences are absorbed. Further, since the surface of metal plate output terminals projecting perpendicular from both ends of a battery module can support battery modules housed in the case, battery modules can be held in the case without rotation via a simple structure and without providing a special configuration to prevent battery module rotation.

Further, since the power source apparatus described above does not require molded end-plates with inserted bus-bars as in prior art, it has the characteristic that the structure of the case itself is simple and manufacturing cost can be reduced. Still further, the power source apparatus described above has the characteristic that a specific battery module can be easily and extremely efficiently replaced when it falls. This is because only the section of the case housing the battery module for replacement needs to be disassembled, not all the nuts and bolts and end-plate as in the prior art.

An output terminal preferably has a through-hole to accommodate a bus-bar attachment bolt. This through-hole can be a long narrow opening extending in the lengthwise direction of the battery module for the purpose of connecting to a bus-bar while absorbing battery module length variation.

The case can be provided with insertion sections to hold bus-bars and output terminals. The case can hold bus-bars and output terminals in the insertion sections and retain battery modules in fixed positions. The case insertion sections can be provided with enough tolerance to absorb errors in battery module length.

Nuts can be fixed to bus-bars. Bolts can be inserted through output terminal through-holes and screwed into nuts attached to the bus-bars to join output terminals and bus-bars in a more reliable fashion.

The above and further objects and features of the invention will more fully be apparent from the following detailed description with accompanying drawings.

DETAILED DESCRIPTION OF THE INVENTION

Figure 2:
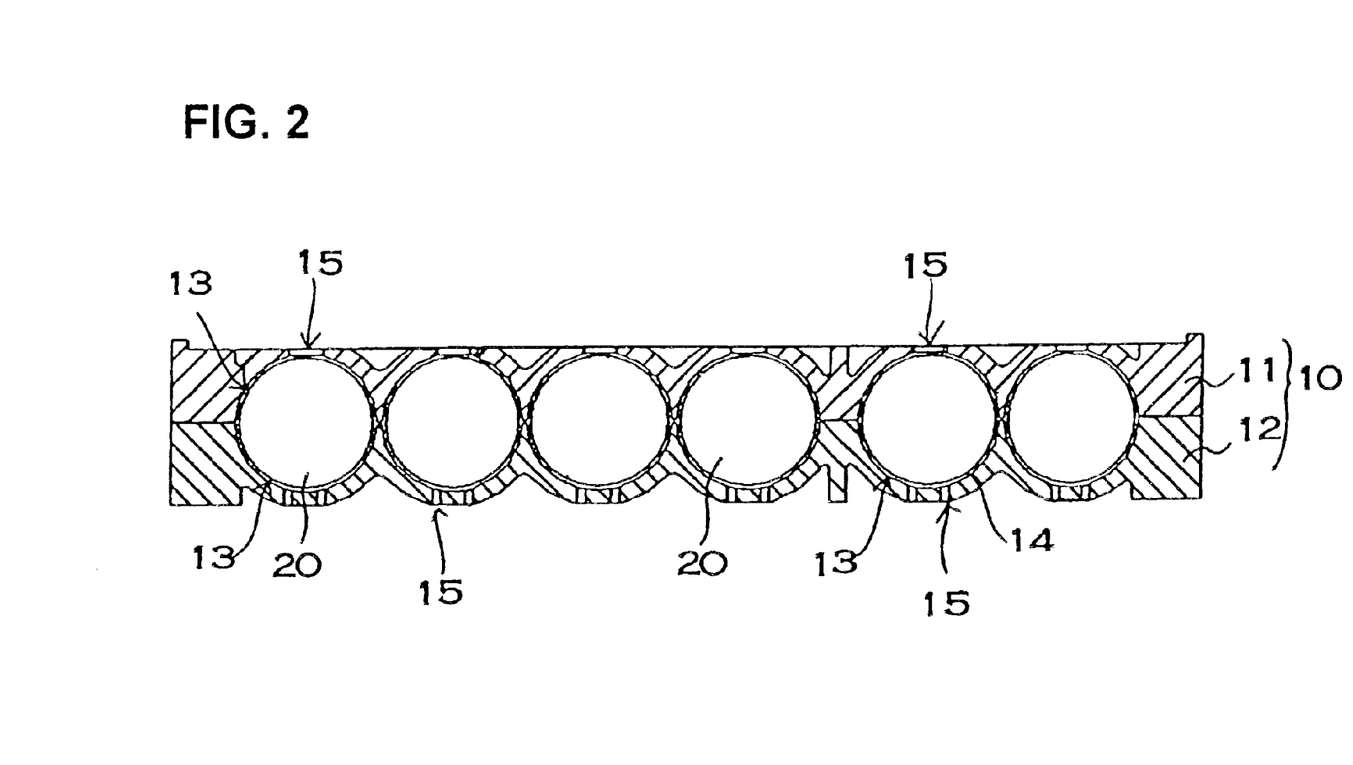
FIG. 2 is a side view in cross-section of an embodiment of the power source apparatus of the present invention.
Figure 3:
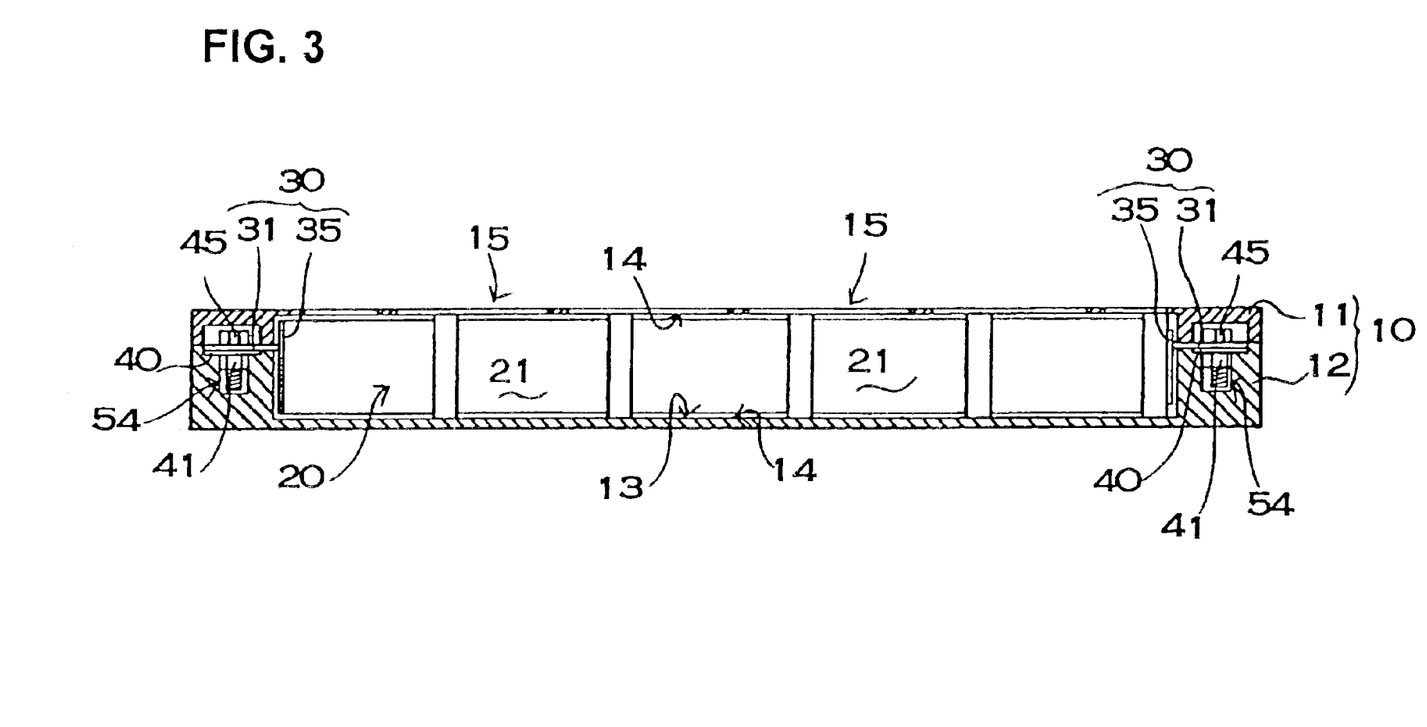
FIG. 3 is a length-wise cross-section view of the power source apparatus shown in FIG. 2.
Figure 4:
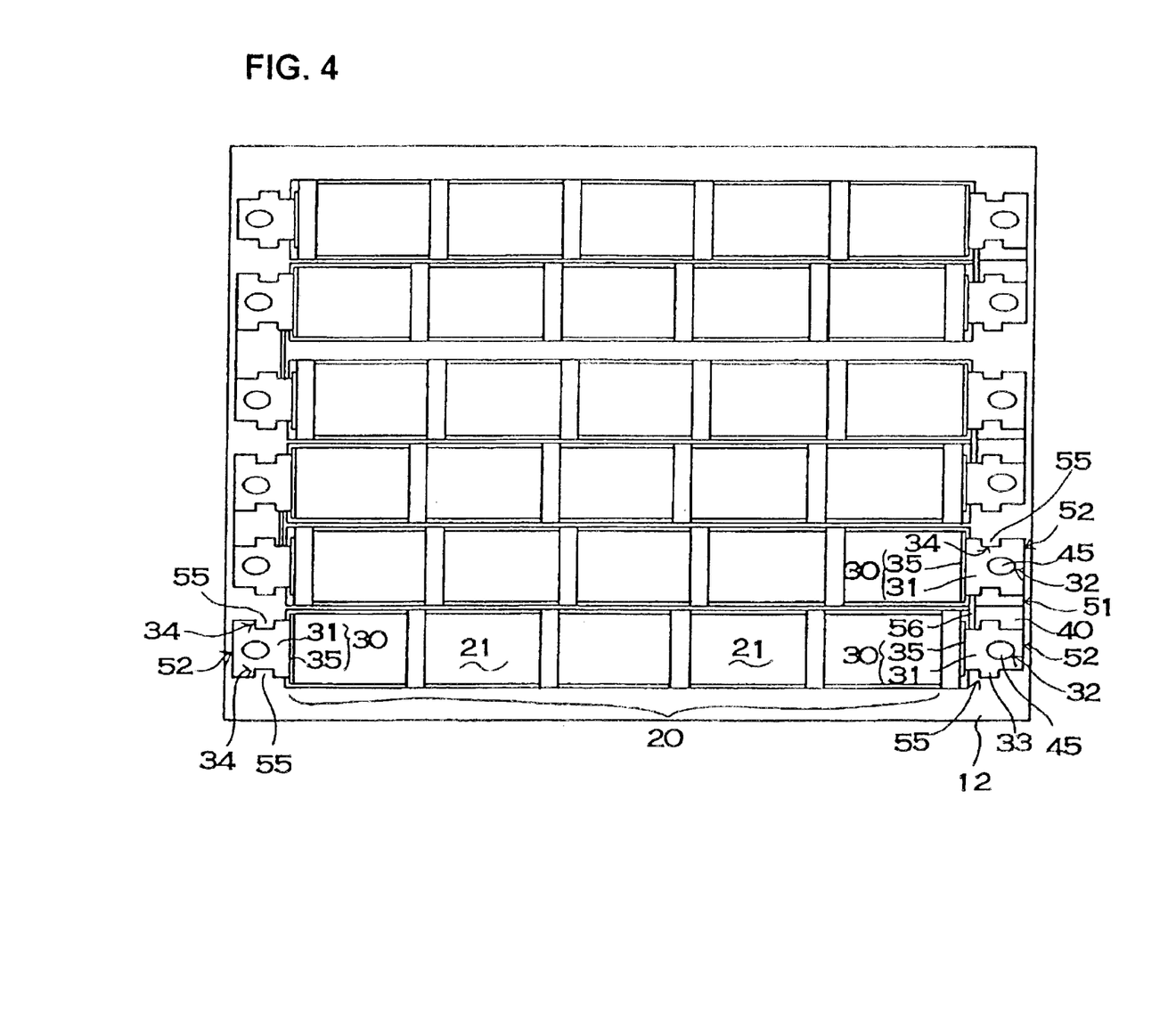
FIG. 4 is a plan view showing the power source apparatus shown in FIG. 2 with the upper case removed.
Figure 5:
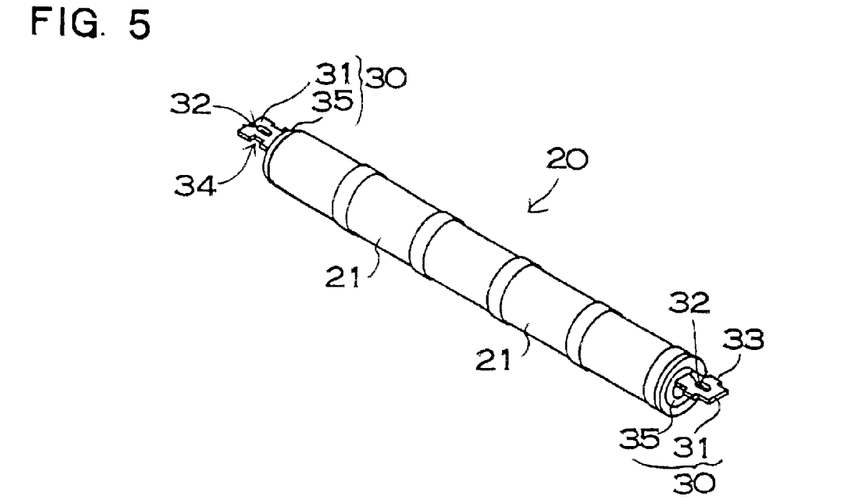
FIG. 5 is a perspective view of a battery module.

The power source apparatus shown in FIGS. 2–4 has a plurality of battery modules 20 housed in a case 10. Battery modules comprise a plurality of batteries 21 connected in a straight line, and adjacent battery modules 20 are connected in series via bus-bars 40. The case 10 is made up of an upper case 11 and a lower case 12. FIG. 2 shows a side cross-section view, FIG. 3 shows a length-wise cross-section view, and FIG. 4 shows a plan view of the power source apparatus with the upper case 11 removed. The power source apparatus shown in these and other figures is primarily used in electric powered automobiles such as hybrid cars. However, the power source apparatus of the present invention can also be used for applications demanding high power output other than electric powered automobiles. As shown in FIG. 5, battery modules shown in the figures have rechargeable batteries 21, which are circular cylindrical batteries, connected in series in a straight line fashion. However, the battery modules may also use square or polygonal batteries.

Any batteries which can be charged, such as nickel hydrogen batteries, lithium ion rechargeable batteries, or nickel cadmium batteries can be used. However, nickel hydrogen batteries are suitable as rechargeable batteries for use in electric powered automobile battery arrays. This is because nickel hydrogen batteries have large output per unit volume and weight, and have excellent high current characteristics.

Figure 6:
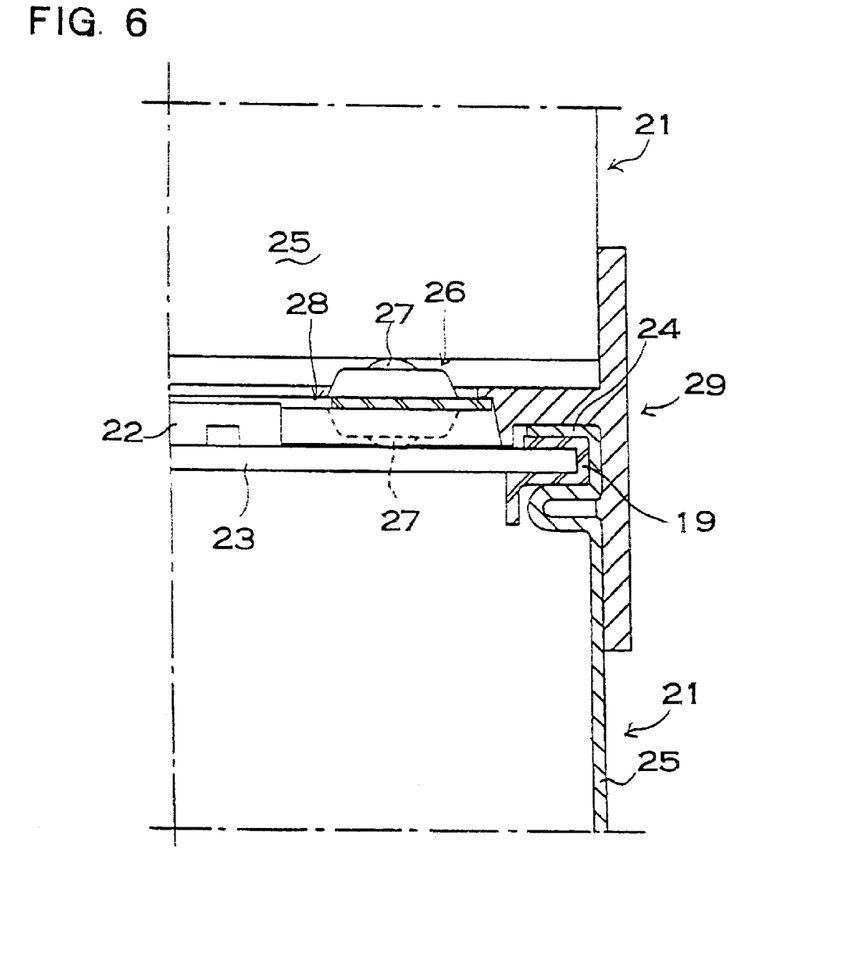
FIG. 6 is an enlarged cross-section view showing the structure joining batteries in the battery module shown in FIG. 5.

As shown in the cross-section view of FIG. 6, a rechargeable battery 21 has an outer casing 25 with an opening hermetically sealed with a closing plate 23. The outer casing 25 and closing plate 23 are formed from metal sheet. Then outer casing 25 is made by press-forming metal sheet into a cylindrical shape with a closed bottom. The closing plate 23 has a protruding electrode 22 welded at its center. Battery electrodes (not illustrated) are contained inside the outer casing 25. The outer casing 25 is also filled with electrolyte solution. The closing plate 23 is hermetically attached at the opening of the outer casing 25 by crimping the edge of the opening. The closing plate 23 is hermetically attached via a gasket 19 sandwiched between the crimped outer casing 25 edge and the closing plate 23. The gasket 19 is an insulating rubber-like flexible material which electrically insulates the closing plate 23 from the outer casing 25 as well as hermetically seals the gap between the closing plate 23 and the outer casing 25. A crimp ring 24 is established around the perimeter of the closing plate 23. The closing plate 23 forms the first electrode of this rechargeable battery 21, and the outer casing 25 forms the second electrode. In a nickel hydrogen battery, the first electrode is the positive electrode and the second electrode is the negative electrode. A rechargeable battery can also have the first electrode as the negative electrode and the second electrode as the positive electrode.

Figure 7:
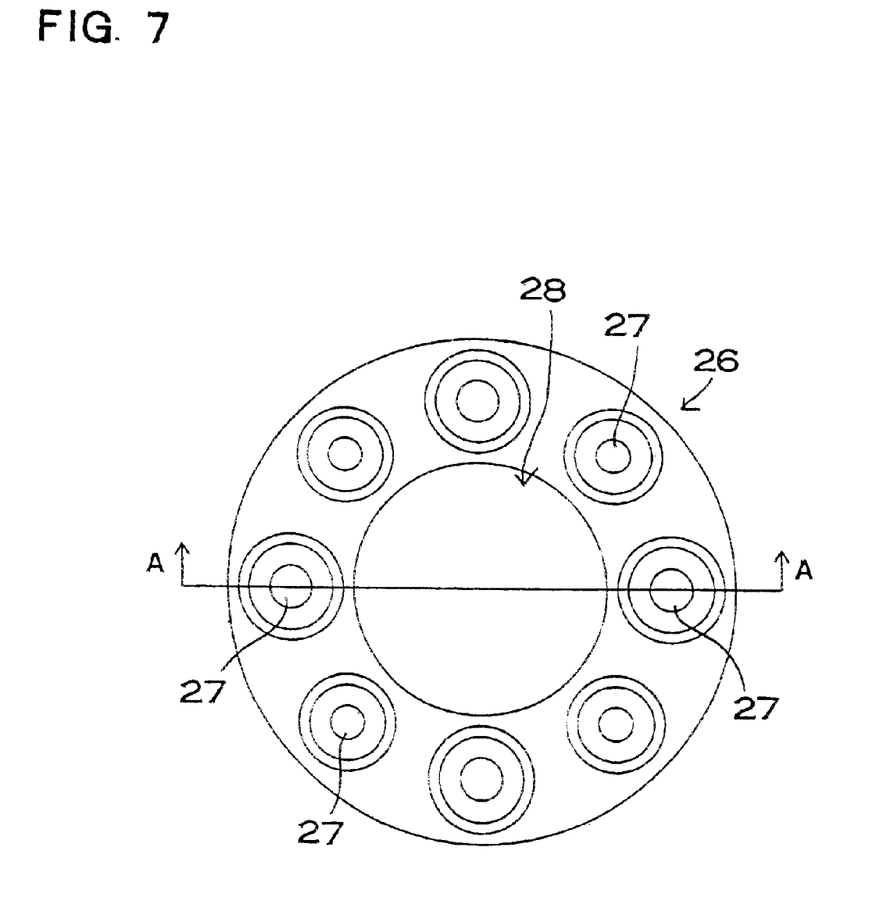
FIG. 7 is a plan view showing the battery connector of the battery module shown in FIG. 6.
Figure 8:
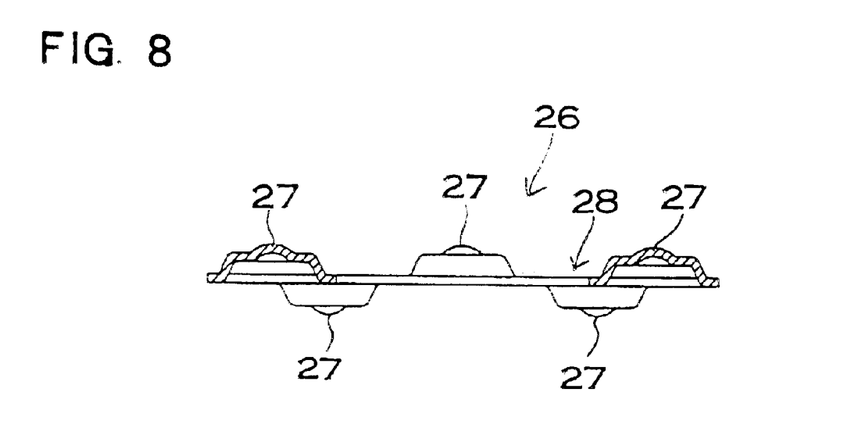
FIG. 8 is a cross-section view taken along line A—A of the connector shown in FIG. 7.

As shown in FIG. 6, connectors 26 are disposed between rechargeable batteries 21, and these connectors 26 connect rechargeable batteries 21 of a battery module 20 in series. In the battery module 20 shown in FIG. 6, the is closing plate 23 of one rechargeable battery 21 is joined to the outer casing 25 of another rechargeable battery 21 via a connector 26. A connector 26 is press-formed from metal sheet, it is weld connected to opposing end-planes of adjacent rechargeable batteries 21, and it electrically connects the rechargeable batteries 21 in series. FIGS. 7 and 8 show a connector 26. FIG. 7 is a plan view of a connector 26 and FIG. 8 is a cross-section view. A connector of this type is formed from metal sheet in an annular shape, and is provided with a plurality of weld projections 27 which extend from both sides for welding to battery end-planes. Weld projections 27 extending from both sides of a connector 26 are welded to opposing battery end-planes to connect adjacent rechargeable batteries 21 in series. The connector 26 of the figures is provided with a center hole 28, and a protruding electrode 22 is disposed in this center hole 28.

As shown in FIG. 6, the connector 26 shown in FIGS. 7 and 8 has an outside diameter smaller than the inside diameter of the crimp ring 24 established on the battery end-plane. Since the closing plate 23 of the rechargeable battery 21 is the first electrode and the outer casing 25 is the second electrode, a short circuit will result if the connector 26 joined to the closing plate 23 touches the crimp ring 24, which is part of the outer casing 25. This connector 26 is provided with a gap between its outer edge and the crimp ring 24 to prevent short circuit caused by contact between the connector 26 and the crimp ring 24. Since the connector 26 may contact the crimp ring 24 if it becomes misaligned, a retaining cap 26 holds the connector 26 in a fixed position. A plurality of weld projections 27 are established on a single circular arc of the connector 26. Weld projections 27 project alternately from opposite sides of the connector 26; namely they project alternately upward and downward in FIG. 8. Weld projections 27 projecting from opposite sides of a connector 26 are welded to opposing battery end-planes to connect those batteries.

A battery module 20 has metal plate output terminals 30 attached at both ends perpendicular to, and projecting from the battery end-planes. Adjacent battery module 20 output terminals 30 are connected by metal plate bus-bars 40. The bus-bars 40 connect battery modules 20 in series. The battery modules 20 are connected by bus-bars 40 and installed in the case 10 in that configuration.

FIGS. 9–14 show output terminals 30 which connect to both ends of a battery module 20. The output terminal 30 shown in FIGS. 9–11 has a different shape than the output terminal 30 shown in FIGS. 12–14. Output terminals 30 of different shapes are attached to battery module 20 positive and negative battery end-planes. Since different shaped output terminals 30 are attached to positive and negative ends of the battery modules 20, they can be installed in the case 10 without mistaking their polarity.

The output terminals 30 shown in the figures described above have attachment plates 35 for welding to battery end-planes. An attachment plate 35 is oriented perpendicular to the main part 31 of an output terminal 30. The main part 31 of an output terminal 30 joins the output terminal 30 to a bus-bar 40. An output terminal 30 with an attachment plate 35 can be securely weld-attached to the battery end-plane of a battery module 20. However, an output terminal does not always have to be provided with an attachment plate. Namely, a planar output terminal cut to a specified shape from metal plate can also be fixed to the end-plane of a battery by welding a lateral edge. As shown in the figures, an output terminal 30 made up of an attachment plate 35 and a main part 31 has two metal pieces bent at right angles which are welded together to overlap and form a double layer at the main part 31. The metal sheet of each metal piece is bent in a right angle to form the attachment plate 35 and main part 31. The two metal pieces are shaped to form a circular attachment plate 35 by weld attaching the them together to form a double layer at the main part 31. An output terminal 30, made by welding together two metal pieces bent at right angles at the boundary between the attachment plate 35 and the main part 31, can be inexpensively manufactured in quantity. Further, compared to an output terminal made by forming an attachment plate and main part as metal plates and welding them together at the boundary, this bent metal piece structure has superior bending strength at the boundary between the attachment plate 35 and main part 31.

Figure 9:
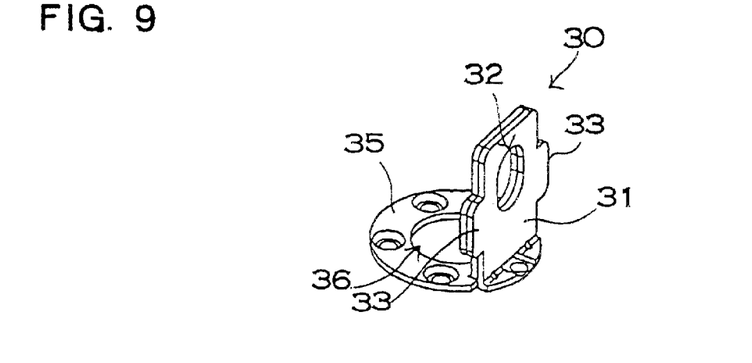
FIG. 9 is a perspective view of an output terminal which connects to one end of a battery module.
Figure 10:
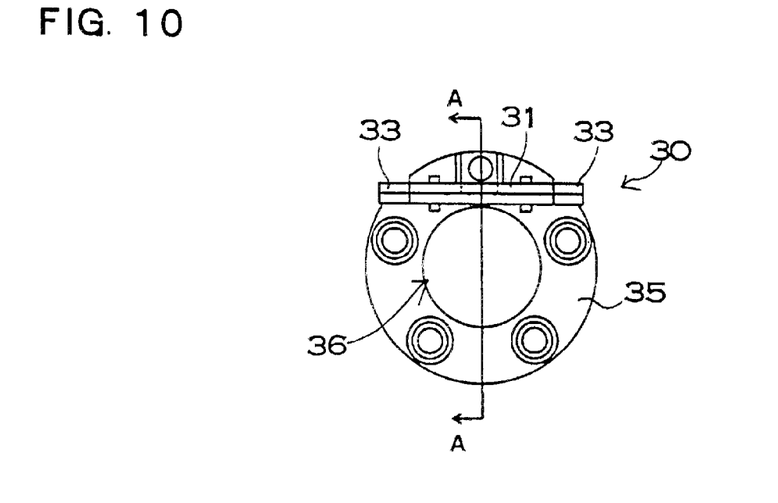
FIG. 10 is a plan view of the output terminal shown in FIG. 9.
Figure 11:
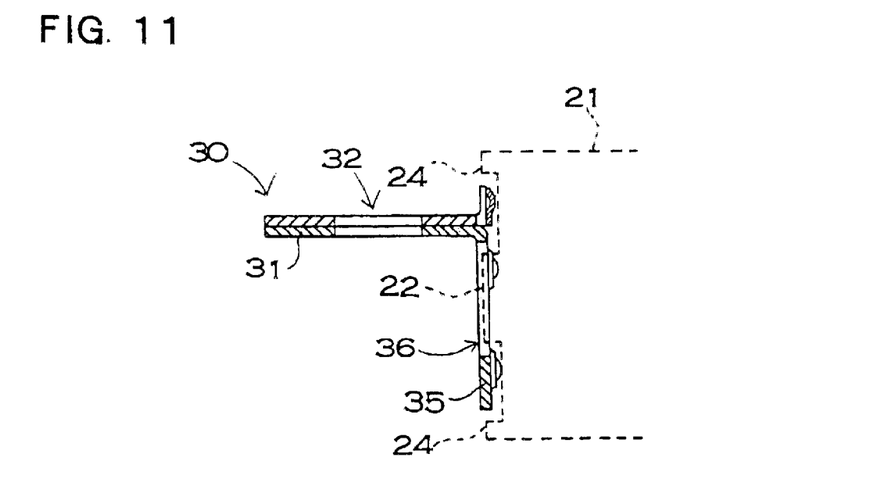
FIG. 11 is a cross-section view taken along line A—A of the output terminal shown in FIG. 10.

Output terminal 30 attachment plates 35 which attach to positive and negative ends of a battery module 20 have different shapes. As shown in the cross-section view of FIG. 11, the output terminal 30 of FIGS. 9–11 is weld-attached to the protruding electrode 22 end of a rechargeable battery 21. This output terminal 30 attachment plate 35 is weld-attached to the battery closing plate 23, which is the first electrode of the rechargeable battery 21. If the attachment plate 35 connected to the battery closing plate 23 contacts the crimp ring 24, which is part of the outer casing 25, a short circuit will occur. Consequently, the outside diameter of the output terminal 30 attachment plate 35 is made smaller than the inside diameter of the rechargeable battery 21 crimp ring 24. This is to avoid contact between the attachment plate 35 and the crimp ring 24. Further, this attachment plate 35 has a center hole 36 to insert the protruding electrode 22 on the battery end-plane. This output terminal 30 is attached by inserting the battery protruding electrode 22 through the center hole 36 of the attachment plate 35 and welding the attachment plate 35 to the battery end-plane closing plate 23.

Figure 12:
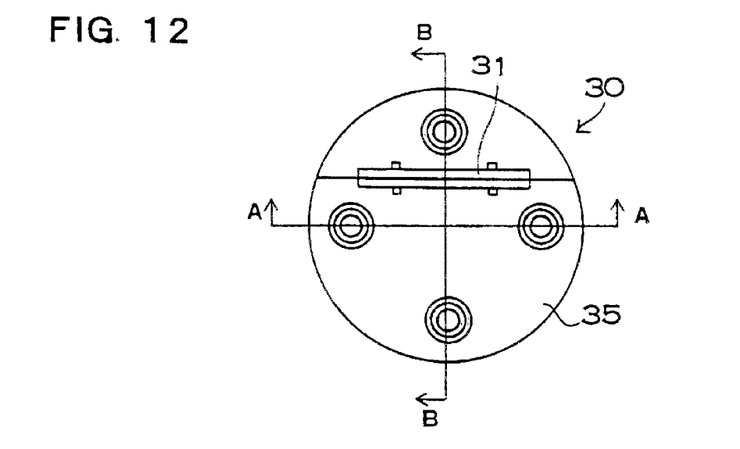
FIG. 12 is a front view of an output terminal which connects to the other end of a battery module.
Figure 13:
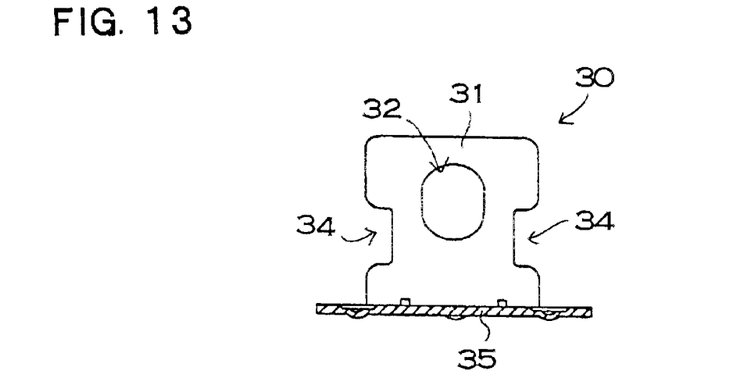
FIG. 13 is a cross-section view taken along line A—A of the output terminal shown in FIG. 12.
Figure 14:
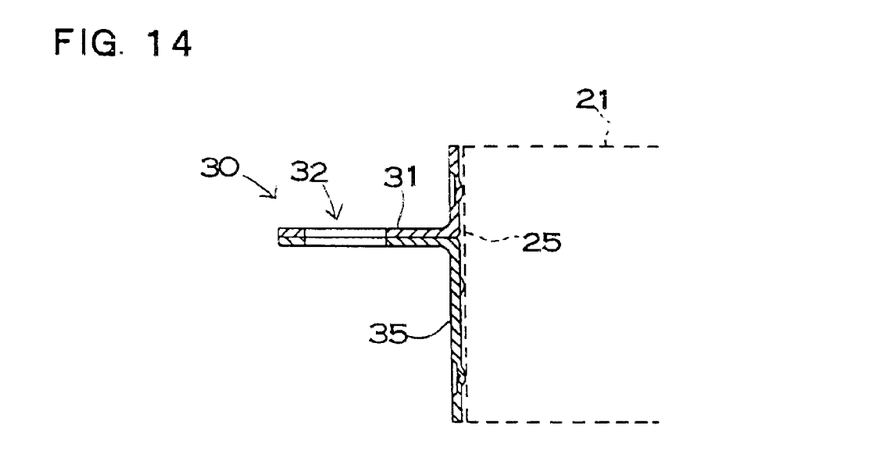
FIG. 14 is a cross-section view taken along line B—B of the output terminal shown in FIG. 12.

As shown in the cross-section view of FIG. 14, the output terminal 30 of FIGS. 12–14 is weld-attached to the planar electrode end of a rechargeable battery 21. The outside diameter of this output terminal 30 attachment plate 35 is made slightly smaller than the outside diameter of the rechargeable battery 21 end-plane. This output terminal 30 is attached by welding the attachment plate 35 to the bottom of the rechargeable battery 21 outer casing 25, which is the second electrode of the rechargeable battery 21.

An output terminal 30 is provided with a through-hole 32 in the main part 31 for insertion of a bolt 45 to join a bus-bar 40. As shown in FIGS. 9 and 13, this through-hole 32 is a long narrow hole extending in the lengthwise direction of the battery module 20, and the through-hole 32 allows bus-bar 40 connection while absorbing battery module 20 length variation. In addition, the output terminal 30 of FIG. 9 is provided with projections 33 on both side edges of the main part 31, and the output terminal 30 of FIG. 13 is provided with indentations 34 on both side edges of the main part 31. Projections 33 and indentations 34 on the main part 31 fit into insertion sections 50 provided in the case 10.

Figure 15:
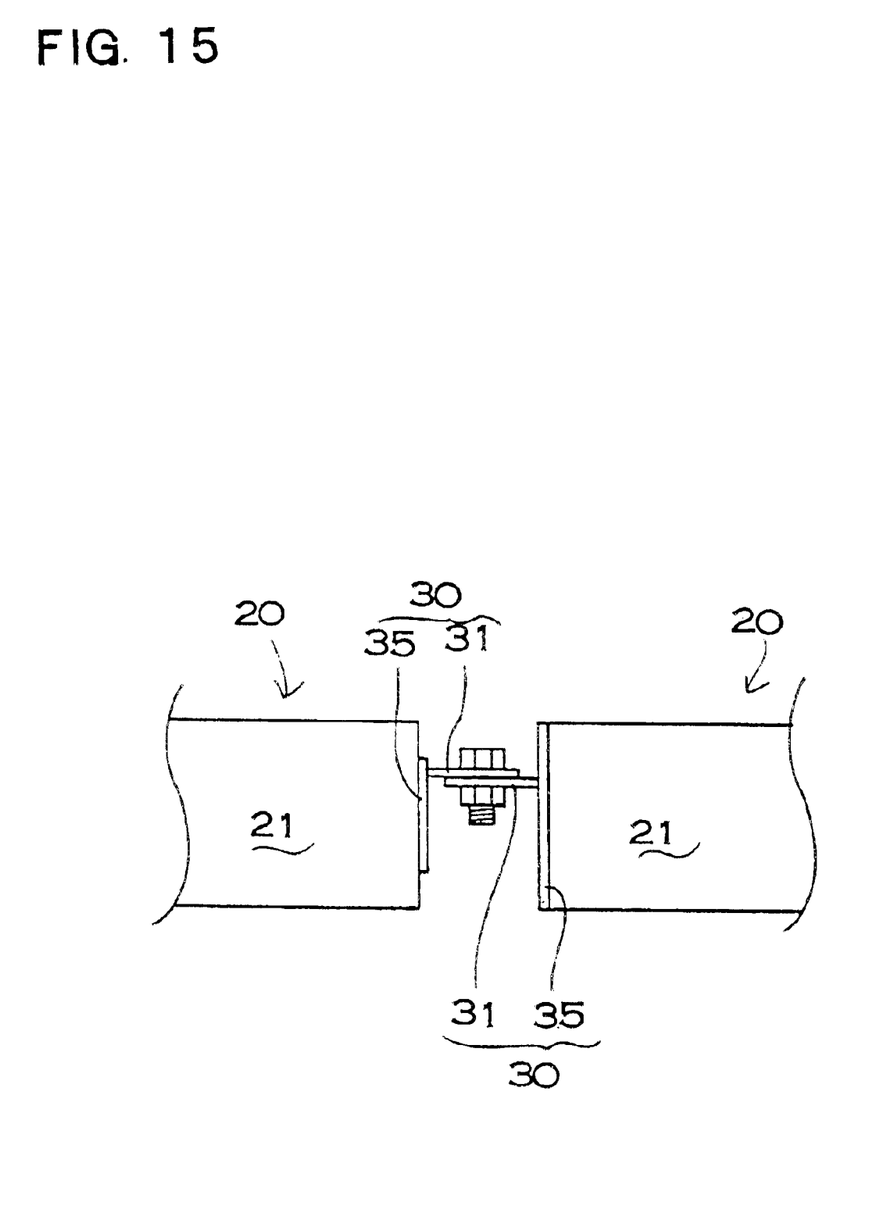
FIG. 15 is a side view showing two battery modules joined together.

As shown in FIG. 15, output terminal 30 fixed to both ends of a battery module 20 have main parts 31 positioned to allow two battery modules 20 to be joined in a straight line. A plurality of battery modules 20 of this type can be joined in series in a straight line.

The case 10 houses a plurality of battery modules 20 assembled in a parallel array in a single plane. The case 10 is made up of an upper case 11 and lower case 12, and the upper and lower cases sandwich the battery modules 20 to retain them in fixed positions. Although it is not illustrated, the upper case 11 and the lower case 12 are securely joined in a detachable manner by fastening screws and nuts. The upper case 11 and lower case 12 shown in FIGS. 2 and 3 are provided with opposing inside surface battery grooves 13 to accept the battery sections of battery modules 20. Further, both side walls of the upper and lower cases are provided with insertion sections 50 to sandwich output terminals 30 and bus-bars 40 at both ends of the battery modules 20.

Figure 16:
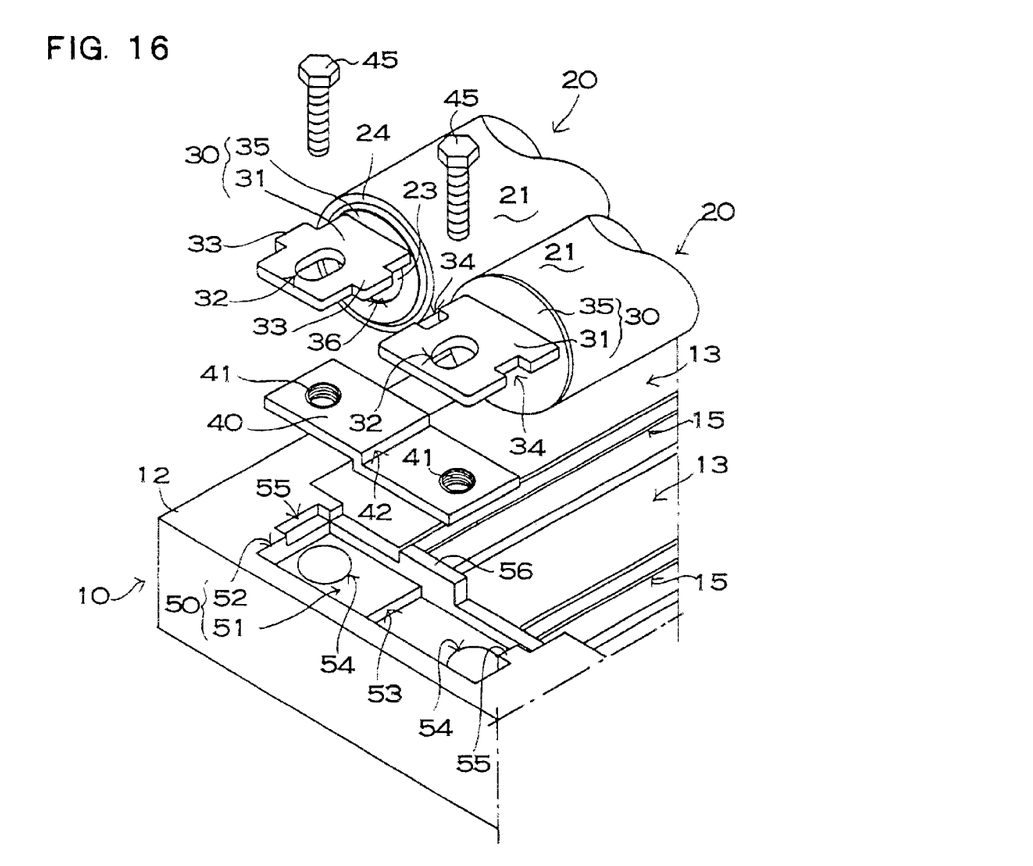
FIG. 16 is an exploded perspective view of the power source apparatus shown in FIG. 4.

FIG. 16 is a detailed perspective view showing an insertion section 50 to provided in a lower case 12 side wall to accept output terminals 30 and a bus-bar 40. The insertion section 50 is a cavity provided in the surface of a side wall, and the insertion section 50 of this and other figures is provided with a bus-bar insertion section 51 to hold a bus-bar 40 and an output terminal insertion section 52 to hold the main parts 31 of output terminals 30. The output terminal insertion section 52 is provided above the bus-bar insertion section 51.

Figure 17:
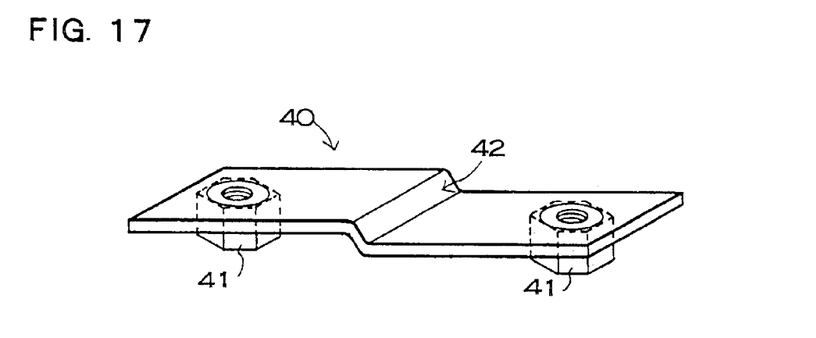
FIG. 17 is a perspective view of a bus-bar.

The bus-bar insertion section 51 inside surface is shaped equivalent to, or slightly larger than the outline of a bus-bar 40 to hold it in position without shifting, As shown in FIGS. 16 and 17, the bus-bar insertion section 51 is provided with a level change 53 in its bottom to fit the bus-bar 40, which is bent to form a level change 42 along its length. As shown in FIG. 15, a level change 42 is provided along the bus-bar 40 to allow battery modules 20 to connect in a straight line without gaps between output terminals 30. This is done by slightly offsetting positive and negative output terminals 30 from the battery module 20 center-line. Further, a bus-bar insertion section 51 is provided with cavities 54 in its bottom to accept nuts 41 fixed to the bottom surface of a bus-bar 40.

An output terminal insertion section 52 is configured to allow insertion of output terminals 30 of battery modules 20 which have error in their length. The inside shape of the output terminal insertion section 52 allows insertion of a pair of output terminals 30 joined to a bus-bar 40, and the inside shape allows insertion of the main part 31 of the output terminal 30 attached to a battery module 20 of maximum length. Further, the perimeter of the output terminal insertion section 52 is provided with positioning sections 55 to mate with projections 33 and indentations 34 provided on the main part 31 of positive and negative output terminals 30. The positioning section 55 which mates with a main part 31 projection 33 has the form of a cavity, and the positioning section 55 which mates with a main part 31 indentation 34 has the form of a projection. These positioning sections 55 are configured with play in the lengthwise direction of the battery modules 20, and they allow insertion of output terminals 30 of battery modules 20 with error in their length dimension. Further, an output terminal insertion section 52 is provided with a projection 56 between each pair of output terminals 30. The projection 56 can retain the projection 33 provided on the main part 31 of an output terminal 30.

The inside surfaces of the battery grooves 13 provided in the upper case 11 and lower case 12 are made slightly larger than the outline of the battery sections of battery modules 20. This is for the purpose of providing cooling gaps 14 to pass cooling air between the inside surfaces of the battery grooves 13 and battery module 20 surfaces. Further, ventilation holes 15 are opened through the bottoms of the battery grooves of the upper case 11 and lower case 12. Cooling air vented into the case 10 from ventilation holes 15 is forced through the cooling gaps 14. Air passing through the cooling gaps 14 flows over battery module 20 surfaces to cool the battery modules 20.

The bus-bars 40 have nuts 41 attached to their bottom surfaces. Output terminals 30 can be easily attached to this type of bus-bar 40. As shown in FIG. 16, this is because bolts 45 can be screwed into output terminal 30 through-holes 32 for attachment.

A power source apparatus as described above is assembled as follows.

(1) Output terminals 30 are weld-attached to both ends of the battery modules 20. Different shaped output terminals 30 are attached to positive and negative ends of the battery modules 20.

(2) Bus-bars 40 are inserted into the lower case 12 bus-bar insertion section 51. Nuts 41 attached to bus-bar 40 bottom surfaces are inserted into bus-bar insertion section 51 cavities 54. In this configuration, bus-bars 40 fit into fixed locations in the lower case 12.

(3) Battery modules 20 are loaded into lower case 12 battery grooves 13 arranging them in a parallel fashion. At this point battery module 20 output terminals 30 rest on top of the bus-bars 40.

(4) Bolts 45 are inserted into output terminal 30 through-holes 32. These bolts 45 are screwed into nuts 41 fixed to the bottom sides of the bus-bars 40 joining output terminals 30 to bus-bars 40. Battery modules 20 loaded into the lower case 12 have adjacent output terminals 30 joined by bus-bars 40 making a series connection.

(5) The upper case 11 is put over the lower case 12, and the upper case 11 is joined to the lower case 12 by fastening screws (not illustrated). In this configuration, battery modules 20 are sandwiched by the upper case 11 and lower case 12 retaining them in fixed positions.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

What is claimed is:

1. A power source apparatus comprising:

a casing;

a plurality of battery modules housed in said casing, each of said battery modules having a plurality of batteries, and each of said batteries having battery end-planes on each end thereof, said batteries in each of said battery modules being connected in a first straight line fashion in series such that the battery end-planes of adjacent batteries are opposed to each other in order to electrically connect the battery terminals, and said battery modules are arranged in a second direction that is substantially perpendicular to the first straight line arrangement of said batteries;

bus-bars connecting said battery modules; and metal plate output terminals attached at both ends of said battery modules, respectively, wherein each of said output terminals is perpendicular to, and projects from the respective battery end-plane, said output terminals being arranged so as to be substantially parallel to adjacent ones of said output terminals, and said output terminals of adjacent battery modules are connected via said bus-bars, wherein each of said output terminals has an attachment plate which is welded to a battery end-plane, and said attachment plate is oriented so as to be perpendicular to a main part of the output terminal which connects to one of said bus-bars.

2. A power source apparatus as recited in claim 1, wherein each of the battery modules has a plurality of rechargeable batteries, which are circular cylindrical batteries.

3. A power source apparatus as recited in claim 1, wherein the rechargeable batteries are nickel hydrogen batteries.

4. A power source apparatus as recited in claim 1, wherein the rechargeable batteries are lithium ion rechargeable batteries.

5. A power source apparatus as recited in claim 1, wherein said case has bus-bar and output terminal insertion sections, and said battery modules are disposed in fixed positions by fitting said bus-bars and said output terminals into the insertion sections.

6. A power source apparatus as recited in claim 1, wherein nuts are attached to the bus-bars, bolts are inserted into through-holes in the output terminals, and the bolts are tightened into the nuts to join the output terminals to the bus-bars.

7. A power source apparatus as recited in claim 1, wherein said case is made up of an upper case and a lower case, battery grooves are provided in the upper case and the lower case to hold said battery modules, the inside diameter of each of the battery grooves is made slightly larger than the outside diameter of the battery section of a battery module, and cooling gaps are establish between the inside surface of the battery groove and the surface of the battery module to permit a flow of cooling air to pass.

8. A power source apparatus comprising:

a casing;

a plurality of battery modules housed in said casing, each of said battery modules having a plurality of batteries, and each of said batteries having battery end-planes on each end thereof, said batteries in each of said battery modules being connected in a first straight line fashion in series such that the battery end-planes of adjacent batteries are opposed to each other in order to electrically connect the battery terminals, and said battery modules are arranged in a second direction that is substantially perpendicular to the first straight line arrangement of said batteries;

bus-bars connecting said battery modules; and metal plate output terminals attached at both ends of said battery modules, respectively, wherein each of said output terminals is perpendicular to, and projects from the respective battery end-plane, said output terminals being arranged so as to be substantially parallel to adjacent ones of said output terminals, and said output terminals of adjacent battery modules are connected via said bus-bars, wherein each of the battery modules has a plurality of rechargeable batteries, which are circular cylindrical batteries, and wherein press-formed metal sheet connectors are disposed between the rechargeable batteries of each battery module, the connectors are weld-attached to opposing battery end-planes of adjacent rechargeable batteries, and the rechargeable batteries are electrically connected in series.

9. A power source apparatus comprising:

a case;

a plurality of battery modules housed in said case, each of said battery modules comprising a plurality of batteries connected in a straight line fashion;

metal plate output terminals attached at both ends of the battery modules perpendicular to, and projecting from battery end-planes; and bus-bars connecting output terminals of adjacent battery modules, wherein each of said output terminals has an attachment plate that is welded to a battery end-plane, and said attachment plate is oriented so as to be perpendicular to a main part of said output terminal which connects to one of said bus-bars, and wherein said output terminal, which is made up of the attachment plate and the main part, has two metal pieces with right angle bends which are weld-attached together where the two pieces overlap to form two layers at the main part.

10. A power source apparatus as recited in claim 9, wherein said case has bus-bar and output terminal insertion sections, and said battery modules are disposed in fixed positions by fitting said bus-bars and said output terminals into said bus-bar and output terminal insertion sections.

11. A power source apparatus comprising:

a case;

a plurality of battery modules housed in said case, each of said battery modules comprising a plurality of batteries connected in a straight line fashion;

bus-bars connecting said battery modules;

metal plate output terminals attached at both ends of said battery modules perpendicular to, and projecting from battery end-planes; and metal plate bus-bars connecting output terminals of adjacent battery modules, wherein each of said output terminals has an attachment plate that is welded to a battery end-plane, and said attachment plate is oriented so as to be perpendicular to a main part of said output terminal which connects to one of said bus-bars, and wherein said output terminal attachment plates that are attached at positive ends said battery modules have a different shape than said output terminal attachment plates attached at negative ends of said battery modules.

12. A power source apparatus as recited in claim 11, wherein said case has bus-bar and output terminal insertion sections, and said battery modules are disposed in fixed positions by fitting said bus-bars and said output terminals into said bus-bar and output terminal insertion sections.

13. A power source apparatus comprising:

a case;

a plurality of battery modules housed in said case, each of said battery modules comprising a plurality of batteries connected in a straight line fashion;

metal plate output terminals attached at both ends of the battery modules perpendicular to, and projecting from battery end-planes; and metal plate bus-bars connecting output terminals of adjacent battery modules, wherein each of said output terminals has a through-hole for bolt insertion to connect to one of said bus-bars, the through-hole is a long narrow opening extending in a lengthwise direction of the battery module, and the through-hole allows bus-bar connection while accommodating battery module length variation.

14. A power source apparatus as recited in claim 13, wherein said case has bus-bar and output terminal insertion sections, and said battery modules are disposed in fixed positions by fitting said bus-bars and said output terminals into said bus-bar and output terminal insertion sections.

15. A power source apparatus comprising:

a case;

a plurality of battery modules housed in said case, each of said battery modules comprising a plurality of batteries connected in a straight line fashion;

metal plate output terminals attached at both ends of the battery modules, said output terminals projecting from battery end-planes so as to be perpendicular thereto; and metal plate bus-bars connecting said output terminals of adjacent battery modules, wherein said case has bus-bar and output terminal insertion sections, and said battery modules are disposed in fixed positions by fitting said bus-bars and said output terminals into the bus-bar and output terminal insertion sections, respectively, wherein tolerance is provided in the case insertion section to accommodate any error in battery module length.

16. A power source apparatus as recited in claim 15, wherein each of said output terminals comprises an attachment plate and a main portion, and each of said output terminals is formed of two metal pieces which have right angle bends and are welded together so that part of the two pieces overlap so as to form two layers at the main portion.

17. A power source apparatus as recited in claim 15, wherein each of said battery modules has a positive end and a negative end, and each of said output terminals has an output terminal attachment plate, wherein the output terminal attachment plates that are attached at the positive ends of said battery modules are shaped differently than the output terminal attachment plates that are attached at the negative ends of said battery modules.

18. A power source apparatus as recited in claim 15, wherein each of said output terminals has a through-hole for bolt insertion to connect to one of said bus-bars, the through-hole being a long narrow opening extending in a lengthwise direction of said respective battery module, wherein the through-hole allows bus-bar connection while accommodating battery module length variation.

19. A power source apparatus as recited in claim 15, wherein each of said output terminals is provided with a main portion for connecting to one of said bus-bars, wherein said main portion at one end of each of said battery modules has projections on opposite side edges, and said main portion at the other end of each of said battery modules has indentations on opposite side edges, and wherein the projections and indentations fit into said respective output terminal insertion sections provided in said case.

20. A power source apparatus as recited in claim 15, wherein at least one of the bus-bar insertion sections is provided with a level change in its bottom to fit the respective bus-bar, which is bent so as to form a level change along its length.

* * * * *